United States Patent [19]
Kawashima et al.

[11] Patent Number: 6,028,906
[45] Date of Patent: *Feb. 22, 2000

[54] MANUFACTURING METHOD OF CONTROL ROD FOR BOILING WATER REACTOR

[75] Inventors: Norio Kawashima, Mito; Yasuyuki Gotoh, Hitachi; Akira Koizumi, Hitachi; Kouichi Machida, Hitachi; Yoshiharu Kikuchi, Hitachi; Takayoshi Yasuda, Mito; Yoshitaka Nishino, Hitachi, all of Japan

[73] Assignees: Hitachi, Ltd., Tokyo; Hitachi Engineering Co., Ltd., Ibaraki, both of Japan

[*] Notice: This patent issued on a continued prosecution application filed under 37 CFR 1.53(d), and is subject to the twenty year patent term provisions of 35 U.S.C. 154(a)(2).

[21] Appl. No.: 09/134,817

[22] Filed: Aug. 17, 1998

[30] Foreign Application Priority Data

Aug. 22, 1997 [JP] Japan .................................. 9-226416

[51] Int. Cl.$^7$ ...................................................... G21C 7/10
[52] U.S. Cl. ............................................. 376/260; 376/327
[58] Field of Search .................................. 376/260, 327, 376/339; 427/5, 6

[56] References Cited

U.S. PATENT DOCUMENTS 4,609,524  9/1986  Ferrari ...................................... 376/327
5,276,718  1/1994  Ueda ........................................ 376/339

FOREIGN PATENT DOCUMENTS

| 58-44237 | 10/1983 | Japan . |
| 59-208044 | 11/1984 | Japan . |
| 61-66188 | 4/1986 | Japan . |
| 62-164863 | 7/1987 | Japan . |
| 62-170470 | 7/1987 | Japan . |

Primary Examiner—Charles T. Jordan
Assistant Examiner—Jack Keith
Attorney, Agent, or Firm—Beall Law Offices

[57] ABSTRACT

The present invention relates to a control rod installed in a boiling water reactor (BWR), and particularly to a control rod using metal. An object of the present invention is to provide a manufacturing method of a control rod for a boiling water reactor, having excellent corrosion resistance in high temperature water and excellent wear resistance at the time of fabrication, and in which the influence of the manufacturing process is slight. In order to achieve the above described object, the present invention provides a manufacturing method of a control rod for a boiling water reactor constructed with sheaths having a U-shaped cross section attached to each end of a tie rod having a cruciform cross section, and rod, plate or oval tube cross section metal hafnium type neutron absorber material contained inside the sheaths, in which an anodized film is provided on a surface of the neutron absorber material as a pre-process of assembly of the neutron absorber material in the structure of the control rod.

5 Claims, 6 Drawing Sheets

(a)

(b)

MANUFACTURING METHOD OF CONTROL ROD FOR BOILING WATER REACTOR

BACKGROUND OF THE INVENTION

The present invention relates to a control rod installed in a boiling water reactor (BWR), and particularly to a control rod using metal hafnium.

In a conventional boiling water reactor, boron carbide type control rods and hafnium type control rods have been used. With a boron carbide type control rod, a plurality of neutron absorber tubes filled with boron carbide powder are covered by U-shaped sheaths, and these are formed in a cruciform manner. Stainless steel (SUS) is used in the neutron absorber tubes and the U-shaped sheaths. In hafnium type control rods, metal hafnium (Hf) rods, plates or oval tubes are arranged in a cruciform manner. Boron carbide and Hf are used as neutron absorber material.

Hf does not have a large thermal neutron absorption cross section, but has a lot of peaks in the resonance energy region. This means that reactivity control ability can be maintained over a long period of time, so it is effective as a reactor control material. As conventional examples using hafnium, for example, a structure using hafnium in an upper portion and side portion of a BWR control rod is disclosed in Japanese patent publication No. Sho. 58-44237.

Hf has excellent corrosion resistance in high temperature water, which is why it is suitable as a material for reactors. However, since it is expected to maintain reactivity control ability for a long period of time, and also to be used for a long time, there here is a need to maintain high corrosion resistance over a long period of time in an in-pile oxidizing environment. Proposals relating to improving corrosion resistance of Hf are made with this type of situation in mind.

For example, Japanese patent laid-open publication No. Sho. 59-208044, discloses technology for improving nodular corrosion resistance by alloying niobium and zirconium (Zr) in specific proportions. Japanese patent laid-open publication No. Sho. 61-66188 discloses technology for prolonging the in-pile usage time by forming a diffuse cementation-coat of steel, chrome, nickel, niobium etc. on the outer surface of an Hf alloy including a small quantity of Zr. With these technologies of the related art, improvements in corrosion resistance can be expected, but they presume a large-scale manufacturing process or processing method.

On the other hand, as means for forming an oxidation cover layer on the surface of Hf, an autoclaving oxidation process has been considered. This method is generally used in zircalloy type fuel cladding pipes, and an oxidation cover layer is formed by processing in high temperature and high pressure vapor for a fixed time. However, with this method, processing facilities become large in size and the process time is long, which has a significant influence on the manufacturing process.

With the method disclosed in Japanese patent laid-open publication No. Sho. 61-66188 as well, if a permeation layer is formed by ion coating, there is need for an annealing process taking a number of hours after that. Accordingly, the influence in the manufacturing process can not be ignored in this case either.

SUMMARY OF THE INVENTION

An object of the present invention is to provide a manufacturing method of a control rod for a boiling water reactor, having excellent corrosion resistance in high temperature water and excellent wear resistance at the time of manufacture, and in which the influence of the manufacturing process is slight.

In order to achieve the above described object, a first aspect of the present invention provides a manufacturing method of a control rod for a boiling water reactor comprising a tie rod having a cruciform cross section, sheaths having a U-shaped cross section attached to each end of the tie rod and hafnium rods, plates or tubes contained inside the sheaths as neutron absorber material, comprising the steps of: providing an anodic oxidation film on a surface of the neutron absorber material; and assembling the neutron absorber material in the structure of the control rod.

In a second aspect of the present invention, said film providing step in the first aspect is carried out in an electrolyte of ammonium borate or oxalic acid, with a conductive material as cathode and the neutron absorber material as anode.

In a third aspect of the present invention, said film providing step in the first aspect is carried out in an electrolyte of ammonium borate, with a direct power source of 10–300V, with platinum or stainless steel as cathode and the neutron absorber material as anode.

In a fourth aspect of the present invention, said film providing step in the first aspect is carried out by soaking gradually said neutron absorber material in an electrolyte for forming gradually said anodic oxidation film on the surface of said neutron absorber material.

In a fifth aspect of the present invention, said film providing step in the first aspect is carried out in an electrolyte, with a first cathode material inserted into the hafnium tube in order to provide an anodic oxidation film on inside surface of the hafnium tube, a second cathode material provided outside the hafnium tube in order to provide an anodic oxidation film on an outer surface of the hafnium tube and said neutron absorber material as anode.

By using the anodizing treatment, since only electrolytic bath facilities need to be prepared, the processing can be completed in small-scale facilities. Also, since the processing time is reduced, it is possible to obtain the same effects as with other oxidation processes without affecting the manufacturing process.

The principle thing about anodizing is that it uses electrolysis of water, and it is common practice to use the object to be treated as the anode, and a conductive material such as platinum or stainless steel etc., as the cathode. If there is a conduction between the two electrodes, the oxygen component of the water forms oxide at the surface of the object material, constituting oxide film processing. If the conduction is direct current, resistance varies due to such factors as the object material, film thickness, and properties of impurities mixed in the film, which means that the extent of the process can be regulated by using a fixed voltage holding method. The electrolyte can be any substance as long as it is conductive, but if the corrosion resistance of the oxide film is considered, it is preferable to use a material including ions such that only a few impurities are exchanged for interstitials of a crystal lattice or a base material components.

In the present invention, there is provided a manufacturing process for a control rod constructed of a neutron absorber tube of metal hafnium rods, plates or oval tubes, having an oxide film treatment step in an electrolytic bath filled with the electrolyte, before a step of assembling the hafnium member into a control rod frame. The metal hafnium forming a surface protection film resulting from the oxide film treatment prevents scratches and wear in subsequent processes, and can be assembled in a more uniform surface condition inside the control rod. Also, during use of an actual reactor, it is expected that reactivity control ability will be maintained over a long period of time, and it is possible to ensure high corrosion resistance over a long period of time under an in-pile oxidizing environment, so that the reactor will be used for longer than at the current time.

DETAILED DESCRIPTION OF THE PREFERRED EMBODIMENT

Figure 1:
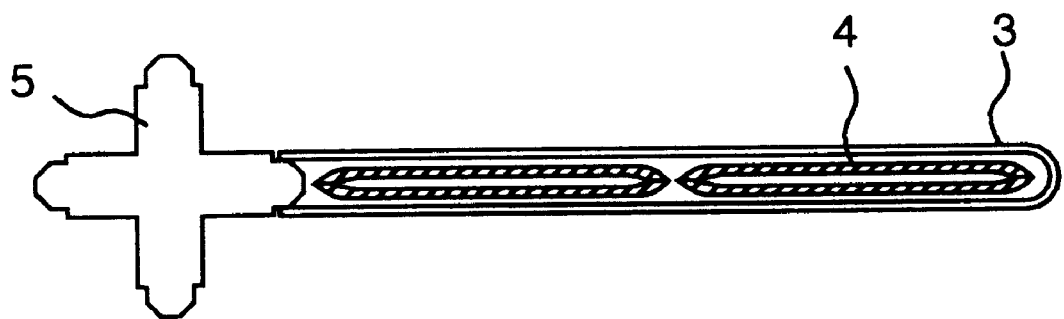
FIG. 1(a) is a horizontal cross sectional drawing around a neutron absorber material of a hafnium type control rod of a preferred embodiment of the present invention.
FIG. 1(b) is a drawing showing the state where an anodic oxidation film has been formed on the surface of a hafnium tube of oval cross section.
Figure 1:
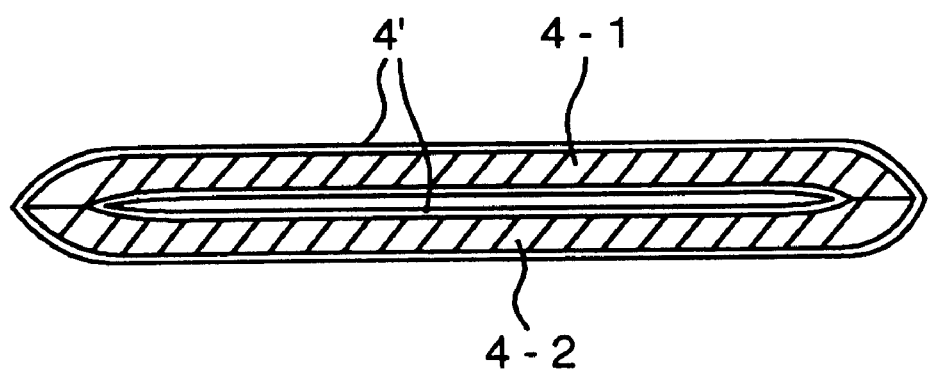

An embodiment of the present invention will be described below using FIG. 1 to FIG. 4. FIG. 4 shows the structure of a control rod for an advanced boiling water reactor, having an oval metal hafnium tube, that has been subjected to anodizing film treatment, in the embodiment of the present invention. This control rod comprises an upper handle 2, a tie rod 5, a sheath 3, a lower connector plate 6, and a coupling socket 7, and is structured with oval tubes of metal hafnium 4 contained inside the sheath 3.

FIG. 1(a) is a horizontal cross section of a region containing the neutron absorber material of the control rod shown in FIG. 4. Each end of the cruciform tie rod 5 is groove shaped, sheaths 3 formed with a U-shaped cross-section are welded to each end of the tie rod 5, and two oval metal hafnium tubes are contained in each space thus formed. There are cases where the plate thickness of metal hafnium is caused to vary in the direction of the axis of the control rod, and cases where the metal hafnium is further divided into a number of tubes in the axis direction.

FIG. 1(b) is an enlarged schematic drawing of the oval tube metal hafnium 4 of the present invention. The oval tubular shape of the metal hafnium is formed by half oval shapes like the members 4-1 and 4-2 shown in FIG. 1 by subjecting metal hafnium plates to bending, then the members 1-4 and 1-2 are joined at the ends and fixed by welding. A surface oxide film 4' is formed on the surface of the oval hafnium tubes by anodizing.

Figure 2:
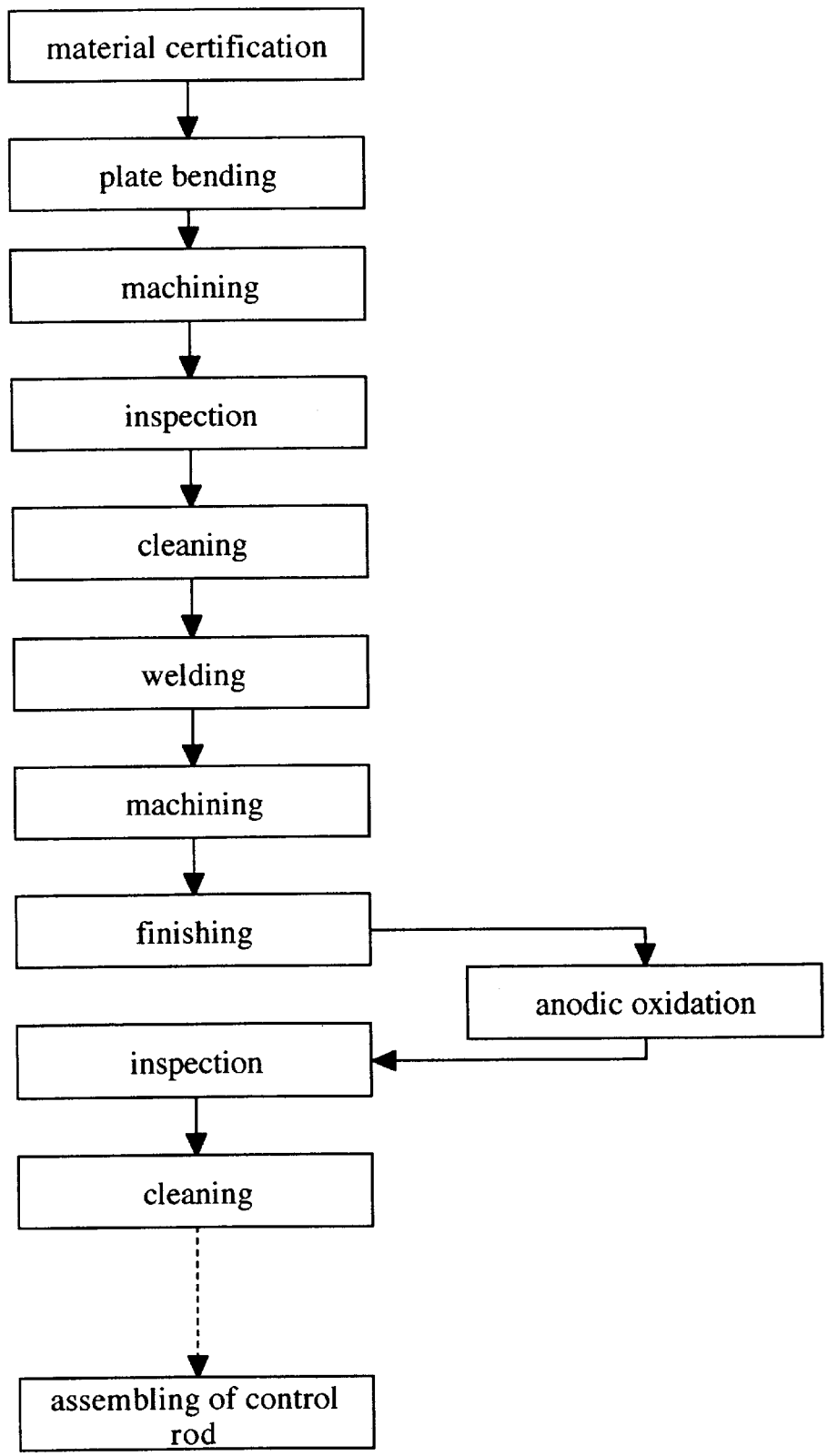
FIG. 2 is a drawing showing an example of a manufacturing process of a metal hafnium tube.

FIG. 2 is a flowchart showing the fabrication sequence for metal hafnium, having an oval tube cross section and provided with an anodized film. The raw material is pure metal hafnium having purity of 95% or more, and material certification is carried out at the time of entering the manufacturing process. Next, bending work is carried out using a pressbrake to impart a radius of curvature at both ends of the long plates. Machining of the grooves for welding is then carried out. After that, welding inspection certification, and cleaning treatment is carried out.

At this stage, the two oval tube half members 4-1 and 4-2 shown in FIG. 1 have been formed. The two oval halves are joined at the ends, and an oval tube is made by welding them together. Machining is then carried out to form cooling holes and fixing holes, etc. in the oval tube, and finishing processing is carried out. At the stage where these processes have been completed, anodizing treatment is carried out in an electrolyte bath.

Figure 3:
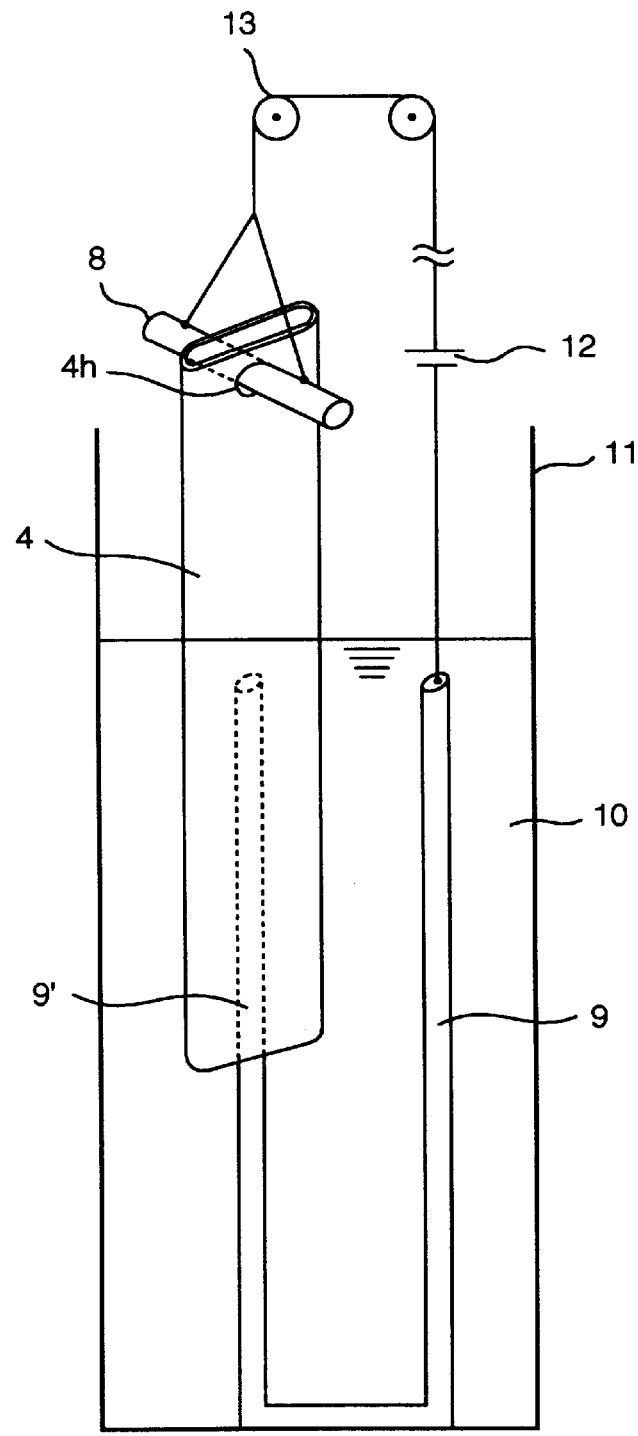
FIG. 3 is a schematic drawing of equipment for anodic oxidation treatment in a mass production manufacturing process.
Figure 4:
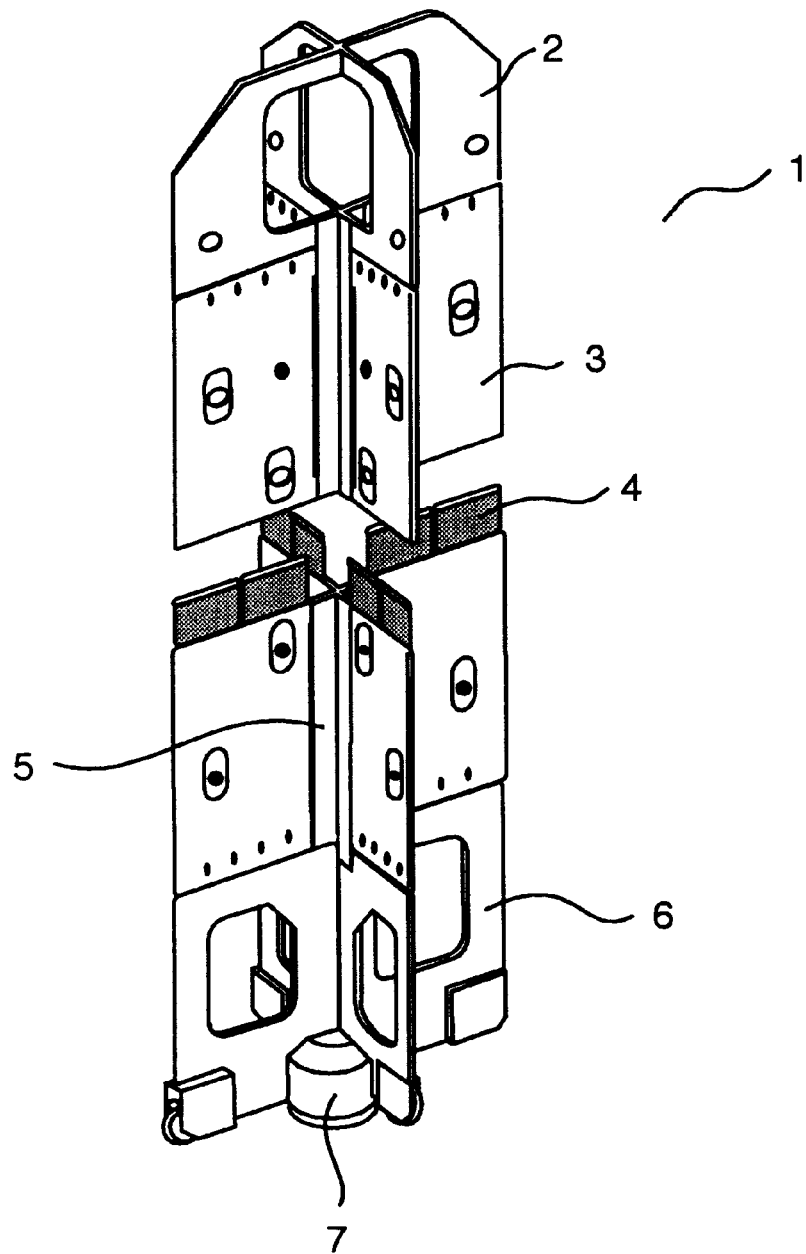
FIG. 4 is a bird's eye view showing an example of a hafnium type control rod used in an advanced boiling water reactor.

FIG. 3 is a schematic drawing showing equipment for carrying out the anodizing treatment. Anode material comprising a stainless steel anode 9, for anodizing the outer surface of the metal hafnium, integrally formed with a stainless steel anode 9' for anodizing the inner surface of the metal hafnium tube, is provided in the electrolytic bath 11, and the electrolytic bath 11 is filled with electrolyte 10. Circular holes 4h for fixing to a control rod structural member is formed in the metal hafnium oval tube, at an end in the longitudinal direction, and the metal hafnium is lowered using these circular holes 4h.

A metal hafnium rod having a diameter smaller than the internal diameter of the circular hole 4h is passed through the circular holes 4h, and is connected to positive electrodes of a direct current source 12 by conductors through a raising and lowering device 13. On the other hand, a conductor is taken out from the anode in the electrolytic bath, and connected to the negative electrode of the direct current source 12. The metal hafnium pipe suspended from the metal hafnium rod 8 is dipped into the electrolytic bath, by the raising and lowering device 13, so that the stainless steel anode 9' having a smaller diameter that the internal diameter of the tube is inserted into the metal hafnium tube.

When anodizing treatment is carried out, there is a current density per unit surface area of a cover oxide member at a level necessary to obtain a uniform oxidation film. As a result, in processing material having a fixed area, like the neutron absorber material used in the control rod in one go, there is a possibility that the necessary current level will become large, exceeding the normal usage range. Using the raising and lowering mechanism 13 as shown in FIG. 3, the processing region of the cover oxide member is divided into a few areas, to provide processing equipment that can carry out the process with a current level within a practical range.

With respect to a necessary current density for anodizing metal hafnium at mass production levels, requirements are determined by additional measurements, but with examined effects for zircalloy having the same crystal lattice interstitial as hafnium and for which characteristics such as oxidation etc. are analogous, current density of about $1A/dm^2$ is obtained.

If calculations are made based on this, then in controlling processing current to be in a normal household level of 10A, in the case of an oval metal hafnium tube having a length of about 1800 mm and a width of about 50 mm, it can be presumed that it would be appropriate to divide the metal hafnium oval tube into four stages.

Therefore, at a first stage a quarter of the length of the metal hafnium oval tube is dipped in the electrolytic bath, current flows from the direct current source, and an anodized film is formed. After the anodized film has stabilized, the anodizing treated metal hafnium tube is lowered by the raising and lowering device, and a further quarter of the hafnium tube is dipped in the electrolytic bath, so that half of the tube is now immersed, and anodizing treatment is carried out. Subsequently, a stabilized anodized film is formed in third and fourth stages.

Using the above process, the oval metal hafnium tube that has been provided with an anodized film on the surface is then subjected to inspection, is cleaned, and then normally progresses to control rod assembly processing, which completes the control rod containing neutron absorber material that has been subjected to anodizing treatment.

A specific method of providing the anodized film on the surface of the metal hafnium will be described below. Short test pieces have been prepared using a hafnium rod having the technical specifications of an actual reactor control rod. Because film certification is carried out at a welded portion, weld material was also prepared as a test piece. Electrolyte used in the test was ammonium borate [1% $(NH_4)_2O.5B_2O_3$].

As a general electrolyte for use in anodizing treatment, KOH or NaOH can be used, but as boric oxide ions are larger than ions of metal such as K and Na etc., it is considered that they will have difficulty in sticking to the hafnium rod as impurities, which is why the aforementioned electrolyte is used. The electrolytic bath is filled with the electrolyte, and anodizing treatment is carried out using platinum as a cathode and the hafnium rod as an anode. At room temperature, direct current at fixed voltages of 100V, 200V and 300V is respectively made to flow between the two electrodes. The period of time for which current flow is maintained was five minutes, for the anodized film formed on the test piece to stabilize.

With the above described method, visual inspection, corrosion resistance test and hardness test are carried out on the test piece which has been subjected to anodizing treatment. Through the visual inspection formation of similar anodized film was observed on test pieces to which direct current having the foregoing values was applied. The surfaces of the welded portion were also no different from the surface of the base material, and it was observed that a favorable anodized film was formed. Because of the influence of voltage, the tone of cover films formed at voltages from 100V to 300V varied from dark blue to dark green. This is a variation in the anodized film formed, and the thickness of a cover film can be judged from the tone.

Figure 5:
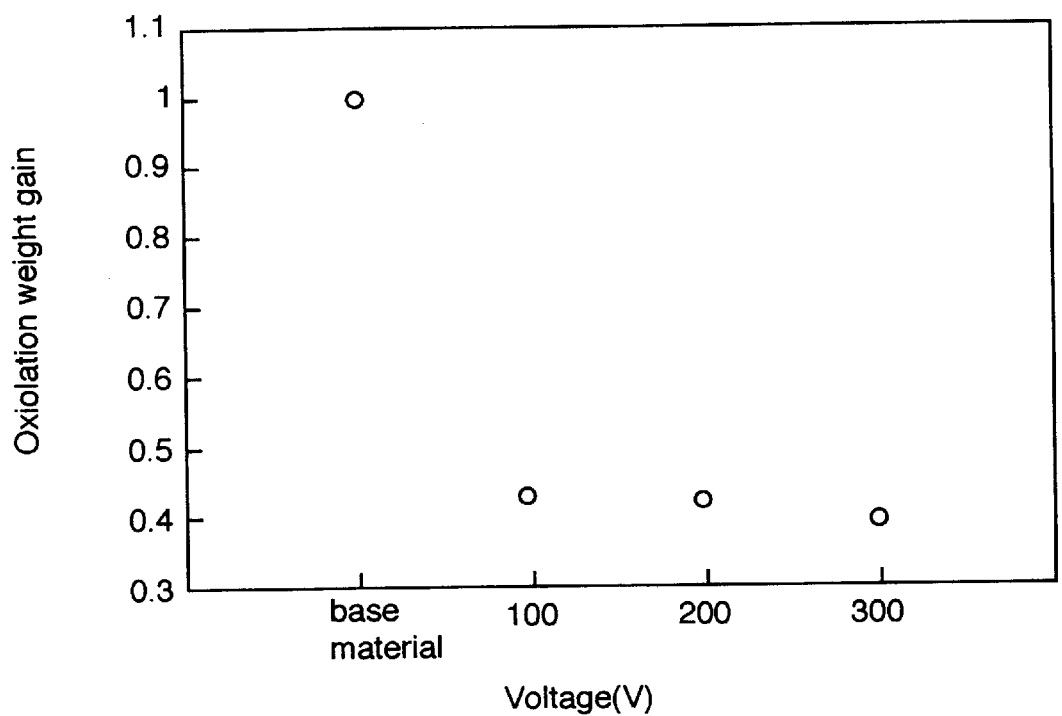
FIG. 5 is a drawing showing oxidation weight after corrosion testing of metal hafnium that has been subjected to anodic oxidation treatment in a preferred embodiment of the present invention.

FIG. 5 is a drawing showing oxidation weight after corrosion testing of the test piece that has been subjected to anodizing film treatment, under the conditions of a test temperature of 410° C. for eight hours and 530° C. for 16 hours, pressure of 105 kg/cm$^2$, dissolved oxygen of 200–400 ppb, and flow rate of 10 liters per hour. The metal hafnium that has been provided with the anodized film was observed to have a tendency toward improved corrosion resistance compared to the base material without the anodized film.

Figure 6:
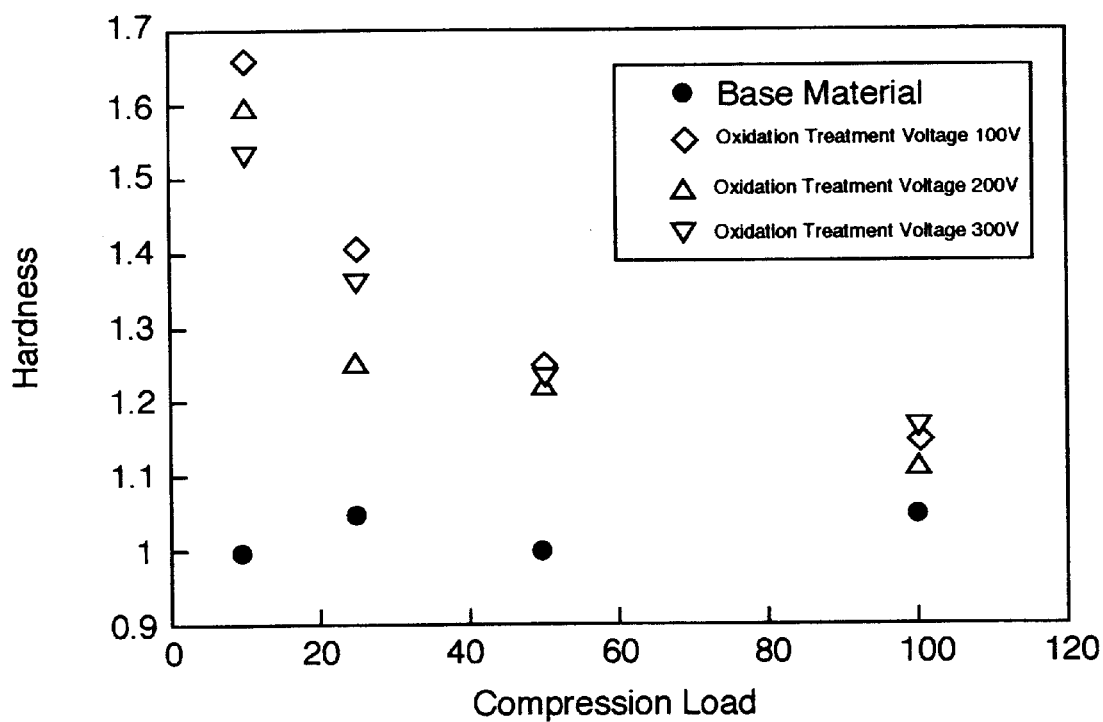
FIG. 6 is a drawing showing hardness of metal hafnium that has been subjected to anodic oxidation film treatment in a preferred embodiment of the present invention.

FIG. 6 shows the measurement results of a hardness test on the test piece provided with the anodized film, taken using a Micro Vickers hardness meter. The metal hafnium that has been provided with the anodized film was observed to have a tendency towards increased surface hardness compared to the base material without the anodized film. However, if the compression load was increased, the hardness of the test piece provided with the anodized film tended to decrease, but with this increased load a compression head destroyed the cover film, and it can be considered that the cover film was also affected by the hardness of the internal base material.

From the above described tests, it will be understood that an anodized film having excellent corrosion resistance and excellent wear resistance can be provided on the surface of metal hafnium that has welded portions, in a comparatively short time.

With a control rod that is actually manufactured, in the case of a hafnium control rod used in an advanced boiling water reactor using metal hafnium oval tubes as a neutron absorber material, in the manufacturing process shown in FIG. 2, there are cases where metal hafnium oval tubes are manufactured. In such a case, the previously described anodizing treatment process is added in the final process shown in FIG. 2, by using equipment for electrolytic treatment as shown in FIG. 3, there will be no significant influence on the manufacturing process, and it is possible to provide a neutron absorber material having excellent corrosion resistance and wear resistance.

In the test, using voltage from 100V to 300V, favorable results are obtained in that the corrosion resistance and wear resistance do not differ greatly with different voltages, but in the processing for an actual product, a relationship between stable film formation and voltage or current value should be understood using an actual electrolytic bath, so that production will be carried out under ideal conditions to give high production efficiency.

What is claimed is:

1. A manufacturing method of a control rod for a boiling water reactor, comprising a tie rod having a cruciform cross section, sheaths having a U-shaped cross section attached to each end of the tie rod, and hafnium rods, plates or tubes contained inside the sheaths as neutron absorber material, comprising the steps of:

providing an anodic oxidation film on a surface of said neutron absorber material; and assembling said neutron absorber material in the structure of the control rod.

2. A manufacturing method of a control rod for a boiling water reactor as claimed in claim 1, wherein, said film providing step is carried out in an electrolyte of ammonium borate or oxalic acid, with a conductive material as cathode and said neutron absorber material as anode.

3. A manufacturing method of a control rod for a boiling water reactor as claimed in claim 1, wherein, said film providing step is carried out in an elecrolyte of ammonium borate with a direct power source of 10–300V, with a platinum or stainless steel as cathode and said neutron absorber material as anode.

4. A manufacturing method of a control rod for a boiling water reactor as claimed in claim 1, wherein, said film providing step is carried out by soaking gradually said neutron absorber material in an electrolyte for forming gradually said ahodic oxidation film on said surface of said neutron absorber material.

5. A manufacturing method of a control rod for a boiling water reactor as claimed in claim 1, wherein, said film providing step is carried out in an electrolyte, with a first cathode material inserted into the hafnium tube in order to provide an anodic oxidation film on inside surface of the hafnium tube;

a second cathode material is provided outside the hafnium tube in order to provide an anodic oxidation film on an outer surface of the hafnium tube and said neutron absorber material as anode.

* * * * *